3,531,417
Patented Sept. 29, 1970

1

3,531,417
SILOXANE ETHER SULFONATES
Edward L. Morehouse, New City, N.Y., assignor to Union
Carbide Corporation, a corporation of New York
No Drawing. Filed Apr. 21, 1967, Ser. No. 632,554
Int. Cl. B01f 17/02; C07f 7/08, 15/00
U.S. Cl. 252—312                                    21 Claims

ABSTRACT OF THE DISCLOSURE

Novel siloxanes containing 1 to 100 mole percent of units having the formula:

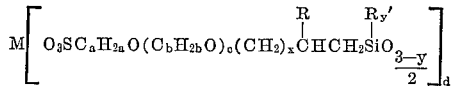

wherein M is a cation selected from the class consisting of monovalent, divalent, trivalent and tetravalent cations, R is a member of the class consisting of hydrogen and alkyl having 1 to 18 carbon atoms, R' is a monovalent hydrocarbon group free of aliphatic unsaturation and having 1 to 18 carbon atoms, $a$ is an integer of 2 to 4, $b$ is an integer of 2 to 4, $c$ is an integer of 1 to 100, $x$ is an integer of 0 to 1, $y$ is an integer of 0 to 2, and $d$ is an integer of 1 to 4 and is equal to the valence of M, and 0 to 99 mole percent of units having the formula:

wherein Z is selected from the class consisting of hydrogen, monovalent hydrocarbon groups free of aliphatic unsaturation and having 1 to 18 carbon atoms, and monovalent polyoxyalkylene groups having the formula: $DO(C_eH_{2e}O)_s(OC)_tC_fH_{2f}$—wherein D is selected from the class consisting of hydrogen, alkyl, acyl and aryl and has no more than 18 carbon atoms, (OC) is carbonyl, $e$ is an integer of 2 to 4, $f$ is an integer of 2 to 4, $t$ is an integer of 0 to 1, and $s$ is an integer of 1 to 100, and $z$ is an integer of 0 to 3. The novel siloxanes have excellent surfactant properties and are useful as wetting agents, emulsifiers foaming agents and detergents.

This invention relates to organosilicon compounds and particularly to siloxanes containing sulfonate groups bonded to silicon through polyether linkages.

The compounds of this invention are siloxanes containing at least one sulfonate siloxy unit of the formula:

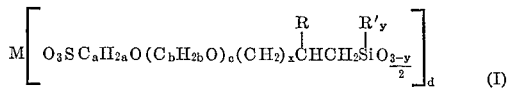    (I)

wherein M is a cation selected from the class consisting of monovalent, divalent, trivalent and tetravalent cations, R is a member of the class consisting of hydrogen and alkyl having 1 to 18 carbon atoms, R' is a monovalent hydrocarbon group free of aliphatic unsaturation and having 1 to 18 carbon atoms, $a$ is an integer of 2 to 4, $b$ is an integer of 2 to 4, $c$ is an integer of 1 to 100, preferably 5 to 75, $x$ is an integer of 0 to 1, $y$ is an integer of 0 to 2, preferably 0 or 1, and $d$ is an integer of 1 to 4 and is equal to the valence of M.

In addition to the sulfonate siloxy unit of Formula I above, the novel siloxanes can also contain siloxy units of the formula:

    (II)

II wherein Z is selected from the class consisting of hydrogen, monovalent hydrocarbon groups free of aliphatic unsaturation and having 1 to 18 carbon atoms, and monovalent polyoxyalkylene groups having the

2 formula: $DO(C_eH_{2e}O)_s(OC)_tC_fH_{2f}$—wherein D is selected from the class consisting of hydrogen, acyl, e.g., alkanoyl or aryl substituted alkanoyl, alkyl and aryl and has no more than 18 carbon atoms, (OC) is carbonyl, $e$ is an integer of 2 to 4, $f$ is an integer of 2 to 4, and $s$ is an integer of 1 to 100, $t$ is an integer of 0 or 1, and $z$ is an integer of 0 to 3.

The amount of units of Formula I in such siloxanes can vary from 1 to 100 mole percent, preferably 10 to 60 mole percent, and the amount of units of Formula II can vary from 0 to 99 mole percent, preferably 40 to 90 mole percent.

Typical of the monovalent hydrocarbon groups represented by R' and Z in the above formulas are the linear alkyl groups (e.g., methyl, ethyl, propyl and butyl groups), cyclic alkyl groups (e.g., cyclopentyl and cyclohexyl groups), the aryl groups (e.g., phenyl and naphthyl groups), the alkaryl groups (e.g., tolyl groups), and the aralkyl groups (e.g., the beta-phenylethyl group). Typical of the groups representing $C_aH_{2a}$ in the above formula are the 1,2-ethylene, 1,3-propylene, and 1,4-butylene groups. Typical of the monovalent polyoxyalkylene groups represented by Z in Formula II are the methyl, ethyl, butyl, nonyl and octadecyl monoethers of polyoxyethylene glycols having, respectively, an average of 3, 4, 6, 9, 12, 13, 16, 22, 35 and 67 oxyethylene units to the molecule the methyl, propyl, nonyl and octadecyl monoethers of polyoxypropylene glycols having respectively, an average of 2, 7, 17 and 40 oxypropylene units to the molecule, and the methyl, butyl and nonyl monoethers of polyoxyethylene-oxypropylene glycols having, respectively, an average of 14 oxxypropylene and 19 oxyethylene units, 10 oxypropylene and 24 oxyethylene units, and 5 oxypropylene and 35 oxyethylene units to the molecule. In the latter mono ethers the oxyethylene units and oxypropylene units can be randomly distributed throughout the polyoxyalkylene chain or they can be in one or more blocks of oxyethylene units joined to one or more blocks of oxypropylene units in the polyoxyalkylene chain.

Representative alkyl groups represented by R in Formula I above include methyl, ethyl, decyl and octadecyl. In Formula I above the integer $b$ can be the same or different throughout the group $(C_bH_{2b}O)_c$. When it is the same, the group represents a polyoxyalkylene chain such as a polyoxyethylene chain or a polyoxypropylene chain. When $b$ is different, the group represents a mixed polyoxyalkylene chain, such as a poly(oxyethyleneoxypropylene) chain. The mixed polyoxyalkylene chain can contain the different oxyalkylene units in random distribution throughout the chain or it can contain one or more blocks of one type of units, e.g., oxyethylene units, joined to one or more blocks of another kind of units, e.g., oxypropylene units. Oxyethylene groups are water-solubilizing groups whereas oxypropylene units, oxybutylene units, siloxane units such as

or

are not. It is preferred, therefore, that the novel siloxanes of this invention contain an adequate proportion of water-solubilizing groups such as oxyethylene groups to impart water-solubility to the siloxanes. This is especially true when the novel siloxanes are to be employed for their surface active properties in aqueous media.

The cation M of Formula I is typified by alkali metal cations, e.g., sodium, potassium, lithium, cesium, or rubidium, ammonium cation, alkyl or aryl substituted ammonium, including trialkylamine cations, e.g., Et$_3$NH+tetra-alkyl ammonium cations wherein the alkyl substituents have 1 to 18 carbon atoms, e.g., tetramethyl ammonium cation, the cuprous cation, divalent metal cations, e.g., barium, calcium, strontium, cobalt, nickel, copper, tin, lead, mercury, zinc, cadmium, magnesium, iron and the like, and trivalent metal cations, e.g., cobalt, iron, aluminum, and tetravalent metal cations, e.g., tin.

The groups R' and Z each can be the same or different throughout the same unit. When $d$ is more than 1, the groups R, R', and Z and the integers $a$, $b$, $c$, $x$, $y$ and $z$ each can be the same or different throughout the same unit. The cation M, the groups R, R', and Z and the integers $a$, $b$, $c$, $d$, $x$, $y$ and $z$ each can be the same or different throughout the same molecule. The novel siloxanes can contain two or more different units of Formula I and/or Formula II in the same molecule or all units of Formula I and/or II may be the same throughout the same molecule.

The novel siloxanes are conveniently made by the addition of hydrosiloxanes, e.g., siloxanes containing silanic hydrogen, and sulfonates of alkenyl polyethers. This reaction is illustrated by the equation:

(A)

$$M[O_3SC_aH_{2a}C(C_bH_{2b}O)_c(CH_2)_xC(R)=CH_2]_d + dHSi(R')_yO_{\frac{3-y}{2}} \longrightarrow$$

$$M\left[O_3SC_aH_{2a}O(C_bH_{2b}O)_c(CH_2)_xCH(R)CH_2Si(R')_yO_{\frac{3-y}{2}}\right]_d$$

wherein M, R, R', $a$, $b$, $c$, $d$, $x$ and $y$ are as defined above.

In general, the reaction illustrated by Equation A can be conducted employing, preferably, from 10 to 20 parts per million parts by weight of the reactants, of a platinum catalyst, e.g., in the form of chloroplatinic acid dissolved, if desired, in a solvent, such as, tetrahydrofuran, ethanol, butanol or a mixture of ethanol and ethylene glycol dimethyl ether, or in the form of finely divided elemental platinum supported on a material, such as, gamma alumina or charcoal. The addition reactions are conducted at a temperature from 60° C. to 200° C., or preferably at a temperature from 70° C. to 130° C. It is preferred to conduct the reaction in the presence of a liquid organic compound or solvent in which the reactants are mutually soluble. Solvents may be preferred in reaction (A) so as to provide greater compatibility between a highly polar sulfonate and the relatively non-polar hydrosiloxane. Preferable solvents are those which do not contain highly reactive hydrogen and include aromatic hydrocarbons (e.g., toluene and xylene) and ethers (e.g. ethylene glycol diethyl ether, diethylene glycol dimethyl ether, diisopropyl ether, and dipropyl ether). Such solvents are employed in an amount from 10 parts to 1000 parts by weight per 100 parts by weight of the reactants.

The relative amounts of the alkenyl polyether sulfonate and the hydrosiloxane employed in producing the siloxanes of this invention are not narrowly critical. A slight excess of alkenyl polyether sulfonate, e.g., 10% excess, is advantageous from the standpoint of more effective and more complete reaction of silanic hydrogen.

The order in which the alkenyl polyether sulfonate, the hydrosiloxane and the platinum catalyst are mixed in forming a reaction mixture for use in producing the siloxanes of this invention is not critical. The catalyst can be added separately to the alkenyl polyether sulfonate or to the hydrosiloxane or can be added to a mixture of these materials. In the case of exothermic reactions, it is preferred to add one of the reactants incrementally to the other. Additional catalyst can be added during the course of the reaction in the event the rate of reaction decreases (e.g., due to catalyst poisoning).

The hydrosiloxanes employed in producing the siloxanes of this invention contain the group represented by the formula:

$$HSiO_{\frac{3-y}{2}}^{R'_y}$$

wherein R' and $y$ have the above-defined meanings. Such starting siloxanes can also contain groups represented by Formula II.

At the conclusion of the reaction illustrated by Equation A, the siloxane of this invention produced as a product can be isolated from the reaction mixture by conventional means. When chloroplatinic acid is used as a catalyst, acidic compounds are formed which are preferably neutralized with a basic compound (e.g., sodium bicarbonate) before isolating the siloxane. Suitable means for isolating the siloxane include sparging the reaction mixture by passing an inert gas (e.g., nitrogen) through the reaction mixture which is maintained at an elevated temperature (e.g., a temperature up to 170° C.) to volatilize any unreacted volatile starting materials. The insoluble catalyst and any insoluble by-product can be conveniently removed by filtration. Fractional distillation can be employed where the siloxane is relatively volatile. In those cases where the siloxane or the siloxane-solvent solution is immiscible with the reactants, separation can be achieved by decantation or use of a separatory funnel.

The above-described addition reactions producing the siloxanes of this invention are remarkably efficient, particularly when sulfonates of allylpolyether starting materials are employed, as compared to seemingly analogous reactions involving allyl alcohol. Specifically, when allyl alcohol is reacted with a hydrosiloxane, the reaction of the COH group of the alcohol with silanic hydrogen occurs to a significant extent and may even be the predominant reaction. On the other hand, when sulfonates of alkenyl (particularly allyl) polyethers are employed as described above in producing the siloxanes of this invention, little if any undesired side reactions between the alkenyl starting material and the silanic hydrogen occur. Moreover, the reaction of such sulfonates of allylpolyethers with hydrosiloxanes to produce the siloxanes of this invention is extremely rapid as compared to the sluggish reactions of this type heretofore known.

The sulfonates of alkenyl polyethers used as starting materials in reaction (A) above can be conveniently prepared by reaction of an alkane sultone, e.g., propane sultone, $$\underset{\longleftarrow}{OCH_2CH_2CH_2SO_2}$$

butane sultone, $$\underset{\longleftarrow}{OCH_2CH_2CH_2CH_2SO_2}$$

or ethane sultone, $$\underset{\longleftarrow}{OCH_2CH_2SO_2}$$

with a monoalkenyl cation oxide:

(B)

$$[CH_2=C(R)(CH_2)_xO(C_bH_{2b}O)_c]_dM + dO(CH_2)_nSO_2 \longrightarrow$$

$$[CH_2=C(R)(CH_2)_xO(C_bH_{2b}O)_cC_aH_{2a}SO_3]_dM$$

wherein M, R, $a$, $b$, $c$, $d$, and $x$ are as defined above. This reaction is rapid and complete at moderate temperatures leaving no by-product salts. The reaction is conveniently carried out by heating in a solvent at atmospheric pressure, or higher pressures and temperatures such as are obtainable in an autoclave can be used. The reaction can be carried out in the presence of a common solvent which does not contain active hydrogen. Such solvents include aromatic and other hydrocarbons and various ethers as mentioned above as solvents for reaction (A). The relative amounts of reactants are not narrowly critical and excesses of one or the other over the stoichiometric amounts shown in Equation B can be used. It is generally preferred to employ a slight excess of sultone to ensure complete sulfonation of the monoalkenyl cation oxide. Any alkaline material (e.g., sodium methoxide) or sultone remaining at the end of the reaction can be removed by acidification, as with HCl, followed by neutralization, as with sodium bicarbonate, and sparging with an inert gas, such as nitrogen, to desolvate.

The monalkenyl cation oxide employed as starting material in reaction (B) can be conveniently prepared by reacting a cation alkoxide, e.g., a cation methoxide, with a monoalkenyl ether of a glycol;

(C) $d\text{CH}_2=\text{C}(R)(\text{CH}_2)_x\text{O}(\text{C}_b\text{H}_{2b}\text{O})_c\text{H} + M(\text{O-Alkyl})_d$
$\rightarrow [\text{CH}_2=\text{C}(R)(\text{CH}_2)_x\text{O}(\text{C}_b\text{H}_{2b}\text{O})_c]_d M + d\text{HO-Alkyl}$ wherein R, M, $b$, $c$, and $x$ are as defined above and alkyl is an alkyl radical having 1 to 6 carbon atoms. The reaction is rapid and complete at moderate temperature leaving no by-product salts. It is preferable to carry out reaction (C) by heating in an organic solvent such as the hydrocarbons and ethers referred to above while removing the by-product alcohol by distillation with or without sparging to drive the reaction to completion. The ratio of reactants is not narrowly critical and the use of approximately stoichiometric amounts is convenient although excesses of one or the other reactant can be used. Many of the cation alkoxides are commercially available or are readily prepared by conventional methods and include sodium methoxide, potassium methoxide, aluminum butoxide, aluminum isopropoxide and other metal alkoxides. Metal oxides or metal hydroxides can also be used as reactants with the monoalkenyl ether. In such cases water is produced as by-product and can be removed by distillation, preferably as an azeotrope with toluene.

The monoalkenyl ethers used in reaction (C) are readily prepared by charging an alkenol, as starter, and an alkaline catalyst, e.g., potassium hydroxide, to an autoclave and injecting an alkylene oxide, e.g., ethylene oxide or propylene oxide, or a mixture of alkylene oxides. The reaction is then carried out under conventional conditions, or other suitable conditions, for the addition of alkylene oxides to alcohols such as methanol, ethanol and the like. There results a monoalkenyl ether which contains very little, if any, dialkenyl ethers.

The novel siloxanes are excellent anionic surfactants and are capable of greatly lowering the surface tension of water, in some cases, as low as 20 dynes/cm. In some instances the surface tension lowering ability and wetting power of the novel siloxanes are superior to conventional organic anionic surfactants. They are useful as powerful wetting agents for polyethylene, cotton and many other substrates. They are also useful as emulsifiers, foaming agents and detergents.

Aqueous solutions of the water-soluble novel siloxanes exhibit very low surface tensions and are useful in a variety of applications, e.g., the production of treating baths in the textile industries, in wetting a wide variety of substrates including polyethylene, cotton, synthetic fibers (e.g., Fortrel, Dacron, Kodel, etc.), blends of cotton and synthetic fibers etc.; in the production of emulsions for use in making polishes and waxes for floors, automobiles, furniture, etc.; in the production of cleaning solutions and so on. Some aqueous solutions can contain as little as 0.01 weight percent and up to 20% or the solubility concentration of the novel siloxane; however, in the usual case, amounts of 0.01 to 1 weight percent are adequate to provide the surface tension lowering effects desired. The aqueous solutions can contain other water-soluble or water-miscible solvents such as lower alkanols including methanol, ethanol, propanol, isopropanol and t-butanol for a variety of purposes, including to promote greater solubility of the novel siloxane or other components of the solution.

The following examples are presented in which Me represents methyl, Et represents ethyl, all refluxing was done at ambient pressure and all parts and percentages are on a weight basis, unless otherwise specified.

EXAMPLE 1

To an allyl polyether of average composition $$\text{CH}_2=\text{CHCH}_2(\text{OC}_2\text{H}_4)_{19}(\text{OC}_3\text{H}_6)_{14}\text{OH}$$

(202 grams, 0.12 mole) in 200 grams of toluene was added sodium methoxide (5.9 grams, 0.11 mole). Methanol was removed by azeotropic distillation at atmospheric pressure and propane sultone (13.4 grams, 0.11 mole) dissolved in 25 ml. of toluene was added in increments during refluxing. Reaction was rapid and exothermic. The reaction mixture was acidified with concentrated HCl, neutralized with NaHCO$_3$, filtered and desolvated by sparging with nitrogen. This product, mainly a sodium polyoxyalkylene sulfonate of average composition $$\text{CH}_2=\text{CHCH}_2(\text{OC}_2\text{H}_4)_{19}(\text{OC}_3\text{H}_6)_{14}\text{OC}_3\text{H}_6\text{SO}_3\text{Na}$$

has a viscosity at 25° C. of 22,000 centistokes and an analysis of Na, 1.1; S, 15; Br. No. 7.3.

The sodium polyether sulfonate (80.6 grams, 0.037 mole of allyl) thus produced was dissolved in 75 ml. of toluene and the solution was added dropwise to a siloxane of average composition Me$_3$SiO(Me$_2$SiO)$_{20}$(MeHSiO)$_{3.2}$SiMe$_3$ (19.4 grams), 0.034 mole of SiH in 75 ml. of toluene using chloroplatinic acid catalyst (10 parts per million based on total charge). Addition was made at 75° C. The reaction mixture was desolvated by sparging with nitrogen, giving a water-soluble semi-solid product consisting mainly of a siloxane-oxyalkylene sulfonate copolymer of average composition Me$_3$SiO(Me$_2$SiO)$_{20}$[NaO$_3$SC$_3$H$_6$O(C$_3$H$_6$O)$_{14}$
(C$_2$H$_4$O)$_{19}$C$_3$H$_6$SiMeO]$_{3.2}$SiMe$_3$ It had the following properties:

1% aqueous cloud point, ° C.: >100
1% aqueous surface tension, dynes/cm.: 40
% Na: 0.8

This surfactant was a detergent for soiled cotton.

EXAMPLE 2

Using the procedure of Example 1 and the sodium polyoxyalkylene sulfonate intermediate prepared therein (49.3 grams, 0.023 mole of allyl), olefinic addition was made to an equilibrated dimethylsiloxane of an average molecular weight of 6400 and containing about 5 methylhydrosiloxy units per average molecule (25.7 grams, 0.021 mole of SiH). The resultant semi-solid copolymer could be dissolved readily in water and was a profoamer. Aqueous surface tension at a concentration of one weight percent of this surfactant was 40 dynes/cm. at 250° C. The average composition of this copolymer was:

Me$_3$SiO(Me$_2$SiO)$_{80}$[NaO$_3$SC$_3$H$_6$O(C$_3$H$_6$O)$_{14}$
(C$_2$H$_4$O)$_{19}$C$_3$H$_6$SiMeO]$_{5.2}$SiMe$_3$

EXAMPLE 3

By the procedure of Example 1, a silicone-oxyalkylene block copolymer was prepared from an 85 centistoke trimethylsiloxy endblocked dimethylsiloxane containing one methylhydrosiloxy unit per 1120 grams (23.4 grams, 0.021 mole SiH) and a blend of 300 molecular weight allyl methyl polyether composed of oxyethylene and oxypropylene units in the ratio 25/75 weight percent, respectively (64.0 grams, 0.017 mole of allyl), and the sodium polyoxyalkylene sufonate of Example 1 (12.6 grams, 0.006 mole of allyl). The copolymer had a viscosity of 14,000 centistokes and a one percent aqueous cloud point of 35° C. The average composition of this anionic surfactant was approximately:

Me$_3$SiO(Me$_2$SiO)$_{72}$[MeO(C$_3$H$_6$O)$_{38}$(C$_2$H$_4$O)$_{17}$
C$_3$H$_6$SiMeO]$_{3.9}$[NaO$_3$SC$_3$H$_6$O(C$_3$H$_6$O)$_{14}$
(C$_2$H$_4$O)$_{19}$C$_3$H$_6$SiMeO]$_{1.3}$SiMe$_3$

EXAMPLE 4

A polyether of average composition
$$CH_2\text{-}CHCH_2(OC_2H_4)_{12}OH$$
(100 grams, 0.17 mole) was dissolved in 200 milliliters of toluene. Sodium methoxide (7.2 grams, 0.13 mole) was added and methanol removed by distillation. Propane sultone was added, and, by the general procedure of Example 1, a sodium polyoxyethylene sulfonate was obtained. It had the average composition
$$CH_2\text{=}CHCH_2(OC_2H_4)_{12}OC_3H_6SO_3Na$$
Using the procedure of Example 1 for addition of olefin to silanic hydrogen, a siloxane-oxyethylene sulfonate copolymer was prepared by reaction of the above sulfonate (25 grams, 0.03 mole of allyl) with a siloxane of average composition
$$Me_3SiO(Me_2SiO)_{20}(MeHSiO)_{3.2}SiMe_3$$
(17.2 grams, 0.03 mole SiH). This sulfonate had the following average composition:
$$Me_3SiO(Me_2SiO)_{20}[NaO_3SC_3H_6O_6(C_2H_4O)_{12}$$
$$C_3H_6O)_{12}HC_3H_6SiMeO]_{3.2}SiMe_3$$

At room temperature it was a solid. At 130° C. it was a viscous liquid. The one percent aqueous cloud point was greater than 100° C. At this concentration the aqueous surface tension at 25° C. was 35 dynes/cm.

EXAMPLE 5

The sodium sulfonate of allyloxytriethylene glycol, $CH_2\text{=}CHCH_2(OC_2H_4)_3OH$, was prepared in ethylene glycol dimethyl ether (Ansul Ether 121) by the general procedure of Example 1 using first sodium methoxide to form the sodium polyether which was then reacted with propane to sultone to form the sodium sulfonate. Platinum-catalyzed addition of this olefinc polyether sulfonate to 3-hydro-heptamethyltrisiloxane, $Me_2SiMeHSiOSiMe_3$, was performed using the procedure of Example 1 in the same solvent. The reaction mixture was filtered, the filter cake treated with ethanol, the mixture refiltered and the filtrate sparged with nitrogen. A white, surface active solid having the formula
$$[Me_3SiO]_2Si(Me)C_3H_6(OC_2H_4)_3OC_3H_6SO_3Na$$
was obtained. Aqueous surface tension at 1.0 and 0.1 weight percent was 26.0 and 28.9 dynes/cm., respectively.

EXAMPLE 6

The silicone sulfonate of Example 1 (3.5 grams), water (66.5 grams) and a 350 centistoke dimethylsilicone oil (30.0 grams) having the formula
$$Me_3SiO(Me_2SiO)_xSiMe_3$$
were mixed mechanically. By the double inversion technique an emulsion was obtained which had a low viscosity and was of fine particle size. The stability of this emulsion in boiling water was better than that of a good silicone emulsion based upon organic emulsifiers.

In general, suitable silicone oils for making emulsions with the novel silicone sulfonates of this invention have the formula: $R_3SiO(R_2SiO)_xSiR_3$ wherein R is alkyl, such as, methyl, ethyl, propyl, butyl and the like, or aryl, such as, phenyl, naphthyl and the like, and x is of such value that the oil has a viscosity of 10 to 100,000, preferably 60,000 centistokes measured at 25° C. The amount of oil in the emulsion can vary from 10 wt. percent or less to 60 wt. percent or more. The amount of silicone sulfonate employed as emulsifier can vary over a wide range, e.g., 1 wt. percent or less to 15 wt. percent or more.

Following the procedures of Examples 1 and/or 2, novel siloxanes of the formula:
$$Me_3SiO[Me_2SiO]_g[NaO_3SC_3H_6O(C_3H_6)_h$$
$$(C_2H_4O)_jC_3H_6Si(Me)O]_kSiMe_3$$
are prepared by reacting a siloxane having the average composition of the formula:
$$Me_3SiOMe_2SiO]_gMeHSiO]_kSiMe_3$$
with a sodium polyoxyalkylene sulfonate of the formula: $NaO_3SC_3H_6O(C_3H_6O)_h(C_2H_4O)_jCH_2CH\text{=}CH_2$ wherein g is an integer of 10 to 100, k is an integer of 1 to 15, h is an integer of 5 to 50 and j is an integer of 5 to 50.

Following the procedures of Example 3, novel siloxanes of the formula:
$$Me_3SiO[Me_2SiO]_g[NaO_3SC_3H_6O(C_3H_6O)_h$$
$$(C_2H_4O)_jCe_3H_6Si(Me)O]_kMeO$$
$$(C_3H_6O)_h(C_2H_4O)_jC_3H_6SiMeO]_lSiMe_3$$
wherein g is an integer of 10 to 100, k is an integer of 1 to 15, l is an integer of 1 to 15, h is an integer of 5 to 50 and need not be the same in the same molecule, and j is an integer of 5 to 50 and need not be the same in the same molecule, are prepared by reacting one mole of a siloxane of the average formula:
$$Me_3SiO[Me_2SiO]_g[MeHSiO]_{k+1}SiMe_3$$
with k moles of a sodium polyoxyalkylene sulfonate of the formula
$$NaO_3SC_3H_6O(C_3H_6O)_h(C_2H_4O)_jCH_2CH\text{=}CH_2$$
and l moles of a monomethyl monoallyl ether of a polyoxyalkylene glycol having the formula:
$$MeO(C_3H_6O)_h(C_2H_4O)_jCH_2CH\text{=}CH_2$$
wherein g, h, k, l and j are as defined above.

Following the procedures of Example 4, novel siloxanes having the formula:
$$Me_3SiO[Me_2SiO]_gNaO_3SC_3H_6O(C_2H_4)_j$$
$$C_3H_6Si(Me)O]_kSiMe_3$$
wherein g is an integer of 10 to 100, k is an integer of 1 to 15, and j is an integer of 5 to 50 are prepared by reacting a siloxane of the formula:
$$Me_3SiO[Me_2SiO]_g[MeHSiO]_kSiMe_3$$
with a sodium polyoxyalkylene sulfonate of the formula $NaC_3SC_3H_6O(C_2H_4O)_jCH_2CH\text{=}CH_2$ wherein g, j and k are as defined above.

Following the procedure of Example 5, novel siloxanes having the formula:
$$[Me_3SiO]_2Si(Me)C_3H_6(OC_2H_4)_{1-10}OC_3H_6SO_3Na$$
are prepared by reacting a siloxane of the formula:
$$[Me_3SiO]_2Si(Me)H$$
with a sodium sulfonate of the formula:
$$NaO_3SC_3H_6(C_2H_4O)_{1-10}CH_2CH\text{=}CH_2$$

Using the procedures set forth in Examples 1, 4 and/or 5, sodium polyoxyalkylene sulfonates of the formulas:
$$NaO_3SC_3H_6O(C_3H_6O)_h(C_2H_4O)_jCH_2CH\text{=}CH_2$$
$$NaO_3SC_3H_6O(C_2H_4O)_jCH_2CH\text{=}CH_2,$$
and $NaO_3SC_3H_6O(C_2H_4O)_{1-10}CH_2CH\text{=}CH_2$ are separately prepared by reacting propane sultone with, respectively monoalkyl ethers of glycols of the formulas:
$$HO(C_3H_6O)_h(C_2H_4O)_jCH_2CH\text{=}CH_2,$$
$$HO(C_2H_4O)_jCH_2CH\text{=}CH_2$$
and $HO(C_2H_4O)_{1-10}CH_2CH\text{=}CH_2$.

The siloxanes of this invention having sodium as the cation, M, can be converted to siloxanes having cations other than sodium by conventional metathetical reactions using chlorides of such other cations, for example, of the formula $MCl_x$. Sodium chloride is produced by the metathesis and the selection of reaction medium should be such that sodium chloride precipitates out while the siloxane reactant, the $MCl_x$ reactant, and the siloxane product remain substantially in solution during the reaction. Since, in the metathesis, the siloxane reactant and product and many of the chlorides $MCl_x$ are soluble in toluene or ether while sodium chloride is not, either of these two solvents can be used as the reaction medium. For example, stannous chloride, stannic chloride, potassium chloride, aluminum chloride, and zinc chloride are soluble in ether, which can be used as the medium for the metathetical reaction to convert siloxanes having sodium as the cation M into corresponding siloxanes having stannous, stannic, potassium, aluminum or zinc as the cation M. When the cation M of the novel siloxanes is multivalent and the siloxane has substantially more than one sulfonate siloxy unit, cross-linking can occur through the multivalent cation to provide a three dimensional resin. By similar procedures ammonium and alkyl ammonium siloxane sulfonates may be prepared. Cation exchange resins can also be used to replace the cations of the novel siloxanes with other cations.

What is claimed is:

1. Siloxane consisting essentially of 1 to 100 mole percent of units having the formula:

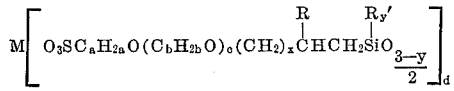

wherein M is a cation selected from the class consisting of monovalent cations selected from the class consisting of ammonium cation, alkali metal cation, trialkyl and tetraalkyl substituted ammonium cations having 1 to 18 carbon atoms per alkyl substituent and the cuprous cation; divalent metal cations from the class consisting of barium, calcium, strontium, cobalt, nickel, copper, tin, lead, mercury, zinc, cadmium magnesium and iron; and trivalent metal cations from the class consisting of cobalt, iron and aluminum, R is a member of the class consisting of hydrogen and alkyl having 1 to 18 carbon atoms, R' is a monovalent hydrocarbon group free of aliphatic unsaturation and having 1 to 18 carbon atoms, $a$ is an integer of 2 to 4, $b$ is an integer of 2 to 4, $c$ is an integer of 1 to 100, $x$ is an integer of 0 to 1, $y$ is an integer of 0 to 2, and $d$ is an integer of 1 to 3 and is equal to the valence of M, and (2) 0 to 99 mole percent of units each having the formula:

wherein Z is selected from the class consisting of hydrogen, monovalent hydrocarbon groups free of aliphatic unsaturation and having 1 to 18 carbon atoms, and monovalent polyoxyalkylene groups having the formula: $DO(C_eH_{2e}O)_s(OC)_tC_fH_{2f}$—wherein D is selected from the class consisting of hydrogen, alkyl, acyl and aryl and has no more than 18 carbon atoms, (OC) is carbonyl, $e$ is an integer of 2 to 4, $f$ is an integer of 2 to 4, $t$ is an integer of 0 to 1, and $s$ is an integer of 1 to 100, and $z$ is an integer of 0 to 3.

2. Siloxane as claimed in claim 1 wherein said cation M is selected from the group consisting of sodium, potassium, ammonium and tetra-alkyl ammonium having 1 to 18 carbon atoms per alkyl substituent and $a$ is 3.

3. A solution containing the siloxane claimed in claim 1 and a solvent therefor.

4. An aqueous solution containing the siloxane claimed in claim 1.

5. An aqueous solution containing the siloxane claimed in claim 2.

6. An aqueous emulsion containing the siloxane claimed in claim 1.

7. An aqueous emulsion containing the siloxane claimed in claim 2.

8. Siloxane as claimed in claim 1 wherein $c$ is an integer of 5 to 75.

9. Siloxane as claimed in claim 1 wherein said $C_bH_{2b}O$ groups contain sufficient oxyethylene groups to impart water-solubility to said siloxane.

10. Siloxane as claimed in claim 1 having the formula:

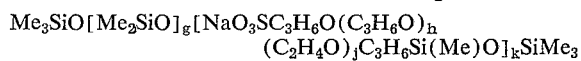

wherein $g$ is an integer of 10 to 100, $k$ is an integer of 1 to 15, $h$ is an integer of 5 to 50 and $j$ is an integer of 5 to 50.

11. Siloxane as claimed in claim 1 having the formula:

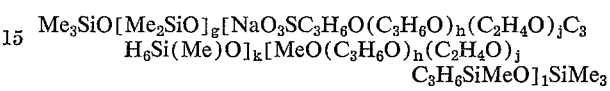

wherein $g$ is an integer of 10 to 100, $k$ is an integer of 1 to 15, $l$ is an integer of 1 to 15, $h$ is an integer of 5 to 50, and $j$ is an integer of 5 to 50.

12. Siloxane as claimed in claim 1 having the formula:

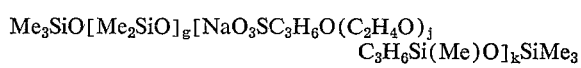

wherein $g$ is an integer of 10 to 100, $j$ is an integer of 5 to 50 and $k$ is an integer of 1 to 15.

13. Siloxane as claimed in claim 1 having the formula: $[Me_3SiO]_2Si(Me)C_3H_6(OC_2H_4)_{1-10}OC_3H_6SO_3Na$.

14. An aqueous solution containing the siloxane claimed in claim 10.

15. An aqueous solution containing the siloxane claimed in claim 11.

16. An aqueous solution containing the siloxane claimed in claim 12.

17. An aqueous solution containing the siloxane claimed in claim 13.

18. An aqueous emulsion containing the siloxane claimed in claim 10.

19. An aqueous emulsion containing the siloxane claimed in claim 11.

20. An aqueous emulsion containing the siloxane claimed in claim 12.

21. An aqueous emulsion containing the siloxane claimed in claim 13.

References Cited

UNITED STATES PATENTS

| 2,968,643 | 1/1961 | Bailey | 260—448.2 X |
| 3,187,033 | 6/1965 | Nitzsche et al. | |
| 3,215,643 | 11/1965 | Pail | 260—448.2 X |
| 3,328,449 | 6/1967 | Haluska. | |

TOBIAS E. LEVOW, Primary Examiner

P. F. SHAVER, Assistant Examiner

U.S. Cl. X.R.

252—353; 260—429, 429.7, 429.9, 431, 435, 438.1, 439, 448, 448.2, 448.8, 513